(12) United States Patent
Pitts et al.

(10) Patent No.: US 11,436,943 B2
(45) Date of Patent: Sep. 6, 2022

(54) MAGNETICALLY PROGRAMMABLE ACTUATORS FOR TACTILE CONVEYANCE OF INFORMATION

(71) Applicants: Wallace Pitts, Raleigh, NC (US); Peichun Yang, Raleigh, NC (US)

(72) Inventors: Wallace Pitts, Raleigh, NC (US); Peichun Yang, Raleigh, NC (US)

(73) Assignee: Polymer Braille Inc., Raleigh, NC (US)

( * ) Notice: Subject to any disclaimer, the term of this patent is extended or adjusted under 35 U.S.C. 154(b) by 0 days.

(21) Appl. No.: 17/050,181

(22) PCT Filed: Apr. 24, 2019

(86) PCT No.: PCT/US2019/028995
§ 371 (c)(1),
(2) Date: Oct. 23, 2020

(87) PCT Pub. No.: WO2019/210002
PCT Pub. Date: Oct. 31, 2019

(65) Prior Publication Data
US 2021/0104175 A1 Apr. 8, 2021

Related U.S. Application Data

(60) Provisional application No. 62/661,636, filed on Apr. 24, 2018.

(51) Int. Cl.
*G09B 21/00* (2006.01)
(52) U.S. Cl.
CPC .................. *G09B 21/004* (2013.01)
(58) Field of Classification Search
CPC .................................................. G09B 21/004
See application file for complete search history.

(56) References Cited

U.S. PATENT DOCUMENTS

| 3,987,438 A | 10/1976 | Lindenmueller |
| 4,194,190 A | 3/1980 | Bareau |

(Continued)

FOREIGN PATENT DOCUMENTS

| CN | 101840647 A | 9/2010 |
| CN | 106846988 A | 6/2017 |

(Continued)

OTHER PUBLICATIONS

International Search Report for PCT/US2019/28995 dated Oct. 28, 2019.

(Continued)

*Primary Examiner* — Vinh T Lam
(74) *Attorney, Agent, or Firm* — Thomas | Horstemeyer, LLP (57) ABSTRACT

This patent describes magnetic Braille cell actuator structures which include Braille pin movement and latching mechanisms. In one example, the Braille pin can be kept at reading position all time by a small force spring and latching of Braille pin can be realized by controlling movement of a latching bar underneath the Braille pin by a combination of electromagnet and permanent magnets working together. In a second example, the Braille pin can be moved between reading and rest positions through the repulsive and attractive interaction between a programmable magnet and a permanent magnet; while the latching of Braille pin is through the jumping and tilting action of the Braille pin onto a latching stage through the horizontal and vertical interactive magnetic forces. The unique magnetic Braille pin movement and latching mechanism enables very low power consumption of Braille display while Braille pin matching the standard spacing.

20 Claims, 9 Drawing Sheets

(56) References Cited

U.S. PATENT DOCUMENTS

| | | | |
|---|---|---|---|
| 6,109,922 A | 8/2000 | Litschel | |
| 6,705,868 B1* | 3/2004 | Schleppenbach | G09B 21/004 434/114 |
| 7,497,687 B2 | 3/2009 | Shin | |
| 9,812,033 B2* | 11/2017 | Chari | G09B 21/004 |
| 10,083,628 B2* | 9/2018 | Yip | G09B 21/004 |
| 2002/0050923 A1* | 5/2002 | Petersen | G09B 21/004 340/407.1 |
| 2004/0110056 A1 | 6/2004 | Kajino | |
| 2004/0110562 A1* | 6/2004 | Kajino | G09B 21/004 463/36 |
| 2004/0145455 A1 | 7/2004 | Gipson et al. | |
| 2005/0237139 A1 | 10/2005 | Marioni | |
| 2008/0227060 A1 | 9/2008 | Esashi | |
| 2017/0175676 A1 | 6/2017 | Murooka et al. | |
| 2017/0309203 A1* | 10/2017 | Kim | G09B 21/006 |
| 2017/0345337 A1* | 11/2017 | Collins, Jr. | G09B 21/004 |
| 2017/0352291 A1 | 12/2017 | Kim et al. | |
| 2018/0277292 A1* | 9/2018 | Zarate | G09B 21/004 |
| 2018/0342176 A1* | 11/2018 | Califorrniaa | G09B 21/004 |
| 2019/0073923 A1 | 3/2019 | Kim et al. | |
| 2019/0214174 A1* | 7/2019 | Bertora | H01F 7/1646 |
| 2019/0385483 A1* | 12/2019 | Cohen | G09B 21/004 |
| 2020/0160747 A1* | 5/2020 | Yang | G09F 9/377 |
| 2020/0211418 A1* | 7/2020 | Greiner | G09B 21/004 |
| 2021/0295739 A1* | 9/2021 | Moon | G06F 3/016 |

FOREIGN PATENT DOCUMENTS

| | | | | |
|---|---|---|---|---|
| CN | 107066101 A | | 8/2017 | |
| CN | 107533810 A | | 1/2018 | |
| CN | 108281070 A | * | 7/2018 | G09B 21/004 |
| CN | 108447351 A | * | 8/2018 | G09B 21/004 |
| DE | 2749585 A1 | | 5/1979 | |
| DE | 4333399 A1 | | 3/1994 | |
| EP | 3550403 A4 | * | 1/2020 | G06F 3/00 |
| GB | 1485698 A | | 9/1977 | |
| JP | 2001265213 A | | 9/2001 | |
| WO | WO-02080134 A1 | * | 10/2002 | G09B 21/003 |
| WO | WO-2005039882 A2 | * | 5/2005 | G09B 21/002 |
| WO | 2011148423 A1 | | 12/2011 | |
| WO | WO-2017191892 A1 | * | 11/2017 | G06F 3/00 |
| WO | WO-2018156475 A1 | * | 8/2018 | G09B 21/004 |
| WO | WO-2020183439 A1 | * | 9/2020 | |

OTHER PUBLICATIONS

Chinese Search Report for CN 201980027215.3 dated Feb. 25, 2022.

Chinese Office Action for CN 201980027215.3 dated Feb. 25, 2022.

First Examination Report for IN Patent Application No. 2020270456 dated Jul. 19, 2022.

* cited by examiner

MAGNETICALLY PROGRAMMABLE ACTUATORS FOR TACTILE CONVEYANCE OF INFORMATION

CROSS REFERENCE TO RELATED APPLICATIONS

This application is the 35 U.S.C. § 371 national stage application of PCT Application No. PCT/US2019/028995, filed Apr. 24, 2019, which claims priority to, and the benefit of, U.S. Provisional Application No. 62/661,636, filed Apr. 24, 2018, both of which are hereby incorporated by reference herein in their entireties.

BACKGROUND OF THE INVENTION

An enormous digital disparity gap exists between sighted and the visually impaired individuals. Imagine using decades-old technology to surf the web, email, text and interact in this digital age. This forces users to read and interact with digital devices one line at a time or listen to text-to-speech engines translate visual information into audio information limiting the ability to skim ahead or move at the readers pace. The other choice is illiteracy and reliance on a mixture of audio and society's assistance which creates a disadvantaged societal interaction. Braille is a tactile medium that can be used to convey written characters and images which are found in digital and written medium in many different languages in the form of a Braille character. The Braille character typically consists of anywhere from 6 to 8 dots depending on the type of the desired medium of conveyance.

BRIEF SUMMARY OF THE INVENTION

Aspects of the present disclosure are related to Braille or tactile actuators, assemblies and cells that can be used to display one or more lines of Braille, tactile graphics, or other tactile information. In one aspect, among others, an actuator can engage and make readable a Braille dot (Braille/tactile pin), through a tilting mechanism that uses the magnetic interference of opposing magnets to push the Braille pin and/or a latching mechanism off a central axis thereby causing mechanical interference that can be sensed. For example, a "hard" magnet can be incorporated into a tactile pin that is opposed or attracted by an programmable magnet in close proximity to it. The reorientation of the magnetic pole by the opposing magnetic field causes the state of the tactile pin to be programmed to produce an interference force or to remove the interference force. In another aspect, an actuator can engage and make readable a Braille dot using a weak spring or springlike interface to hold the Braille dot (Braille/tactile pin) in a raised position. A latching mechanism can be rotated into or out of a position of interference to hold or release the pin depending on the needed status. For example, the rotating mechanism can be a tactile pin made of a ferrous medium that can be programmed to rotate between two fixed magnets depending on the applied electric field.

In one aspect, among others, a tactile actuator comprises a Braille pin comprising a first end extending through a tactile surface of the tactile actuator, the Braille pin supported by a magnetic spring; and a latching assembly comprising an L-bar a first arm extending radially from a second arm that extends through an electrical coil, the latching assembly configured to block axial movement of the Braille pin by rotating the L-bar in response to a control signal provided to the electrical coil. In one or more aspects, the latching assembly can comprise a latching block attached to an end of the second arm opposite the first arm. The latching block can be rotated under a second end of the Braille pin by rotation of the L-bar to block the axial movement. In other aspects, the first arm can be rotated under the second end of the Braille pin by rotation of the L-bar to block the axial movement. In various aspects, the magnetic spring can comprise a magnet engaged with the Braille pin and a ferrous plate forming the tactile surface of the tactile actuator, where attraction of the magnet towards the ferrous plate provides a force supporting the brail pin. The magnet can be a circular magnet surrounding a portion of the Braille pin and engaged with a shoulder of the Braille pin. The Braille pin can comprise a tactile surface at the first end. The latching assembly can comprise a coil base supporting the electrical coil and L-bar. The latching assembly can comprise first and second magnets of opposite polarities, the first and second magnets positioned on opposite sides of the coil base. The L-bar can be iron or other appropriate magnetically conductive material.

In another aspect, a tactile actuator comprises a Braille pin disposed in a cavity, the Braille pin comprising a first end configured to extend through a surface of the tactile actuator, and a second end comprising a permanent magnet having a fixed polarity; and a latching assembly comprising a programmable magnet disposed in an electrical coil under the second end of the Braille pin, the latching assembly configured to adjust polarity of the programmable magnet in response to a control signal provided to the electrical coil. A first polarity of the programmable magnet repels the fixed polarity of the permanent magnet thereby latching the Braille pin in a tilted position with the first end extending through the surface, and a second polarity of the programmable magnet attracts the fixed polarity of the permanent magnet thereby retracing the Braille pin into the cavity. In one or more aspects, the Braille pin can be retracted into a recess in the cavity adjacent to the programmable magnet. The surface can be a tactile surface provided by a pin cap disposed over the cavity of the tactile actuator. In various aspects, the tactile actuator can comprise an isolation pin assembly positioned on the surface of the tactile actuator. The isolation pin assembly can comprise an isolation pin that is horizontally constrained and positioned on the first end of the Braille pin. The latching assembly can comprise a coil holder supporting the electrical coil and programmable magnet. In some aspects, the tactile actuator can comprise an enhanced magnetic flux guide extending along a side of the coil holder and across a length of the coil and programmable magnet.

In other aspects, a Braille display comprises an array of tactile actuators. The array of tactile actuators can consist of a single line of tactile actuators or can comprise multiple lines of tactile actuators. Other array orientations are also possible. In various aspects, the array of tactile actuators can comprise a multitude of actuators such as, but not limited to, 1, 2, 4, 6, 8, 9, 10 or more tactile actuators.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Further more, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. Example embodiments will become e apparent by describing the attached drawings, wherein like elements are represented by like flee numerals, which are given by way of illustration only and thus do not limit the example embodiments herein.

DETAILED DESCRIPTION OF THE INVENTION

Commercially available displays comprise multiple Braille characters arranged in a single line. When an electrical signal is applied to some of the Braille characters, an electro-mechanical actuation causes some of the Braille characters to present a tactilely discernible force to the readers finger while others do not. This is the fundamental basis of the Braille characters. There are significant challenges for being able to present a tactilely discernible force in the required Braille cell dimensions.

This technology can allow Braille readers to enter the digital age by overcoming these challenges creating robust, energy efficient, electronic Braille cells that can power digital multi-line displays and interfaces as well as single line displays.

Disclosed herein are various examples related to Braille cells. In one example, a magnetic Braille cell actuator design can be based off of a mechanical spring preload and L bar rotation latching mechanism called LMP (Latching Magnetic Pin). A second design can be based off of a magnetically programmable switching and tilt latching mechanism, called MPT (Magnetic Pin Tilt). In addition, an example of a third actuator design can be based on the magnetically programmable switching and tilt latching mechanism, but is further enhanced with an additional magnetic pole to assist in latching. This design can be called EMPT (Enhanced MPT).

Figure 1:
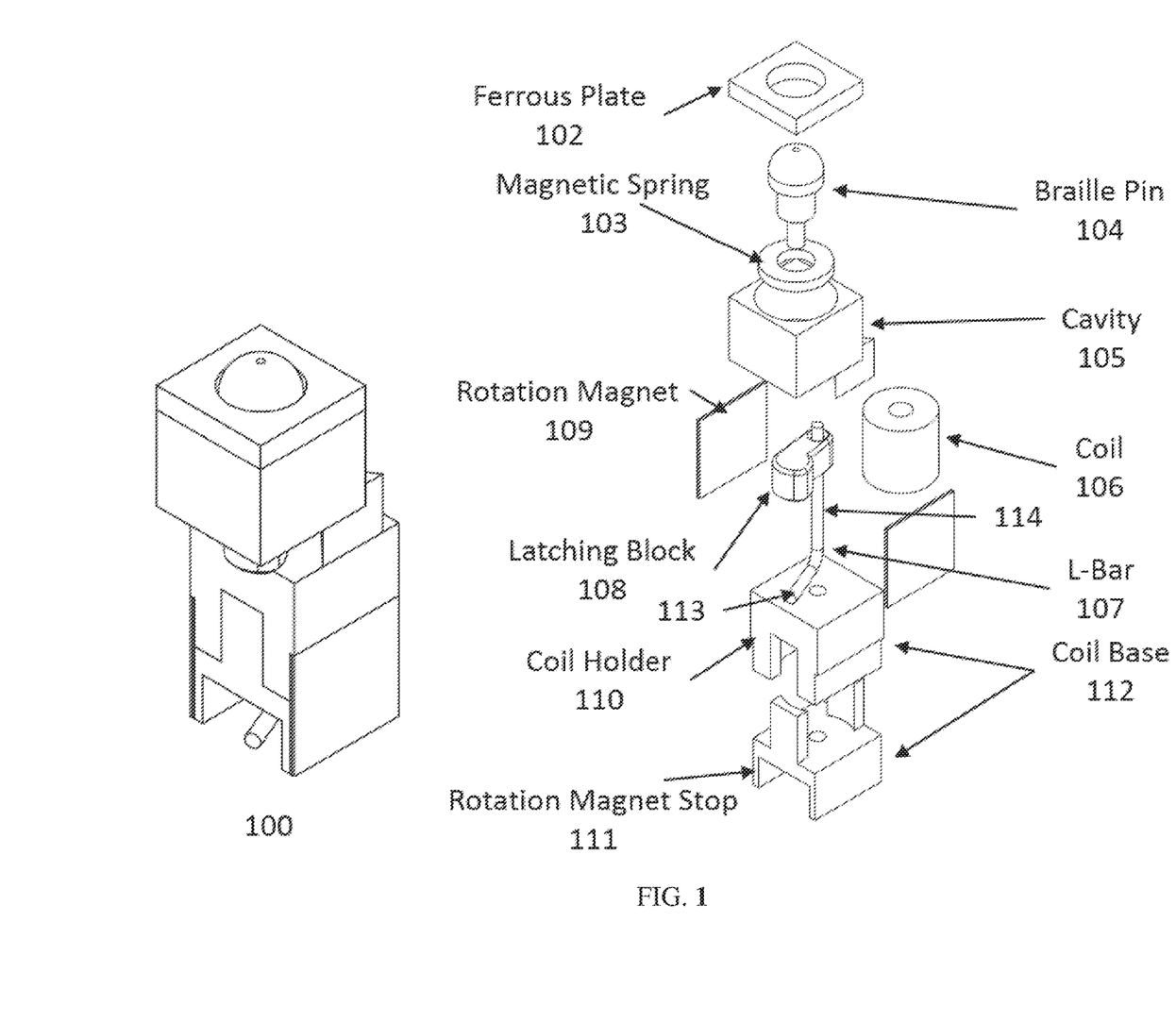
FIG. 1 illustrates an example of a mechanical spring preload tactile actuator, Latching Magnetic Pin (LMP), in accordance with the various embodiments of the present disclosure.

Latching Magnetic Pin (LMP) Braille Actuators: Referring to FIG. 1, shown is an example of a magnetic spring pre-load and L-bar rotation latching Braille cell actuation system, LMP 100. The LMP 100 includes a multitude of components as illustrated in FIG. 1. The top surface of the LMP 100 can be formed by a ferrous plate 102 that can be used to attract a magnet 103, which can engage with a tactile (or Braille) pin 104. The ferrous plate 102 and magnet 103 form a magnetic spring that can be used to hold the tactile pin 104 in a raised position in the cavity 105. The magnetic spring portion of the LMP 100 can be called a spring pre-load that are keeping all of Braille pins in reading position. The magnetic attraction between the magnet 103 and the ferrous plate 102 holds the tactile pin 104 in the raised position. The force of the magnetic spring 103 can be controlled around 1 gram, for example, or other appropriate value.

The tactile (or Braille) pin 104 can be configured to be either blocking or non-blocking in response to a control signal applied to the coil 106. An L-bar 107, which can be made of a ferrous material bent into an L shape, extends through the coil 106 with a latching block 108 attached at one end. Rotation of the latching block 108 below the tactile pin 104 secures the pin 104 in the blocking position. The rotation of the L-bar 107 and latching block 108 can be controlled using the coil 106 and rotation magnets 109. A coil holder 110 in conjunction with a rotation magnet stop 111 form a coil base 112 that supports the coil 106, with rotation magnets 109 positioned on opposite sides. The end of the L-bar 107 connected to the latching block 108 extends through the coil holder 110 while the other end extends through the rotation magnet stop 111. The L-bar 107 includes a first arm (or arm one) 113 that rotates between the magnets 109 based on the control signal applied to the coil 106, and a second arm 114 extending through the coil 106. When all of these components are assembled they form an arrayable LMP 100 as illustrated in FIG. 1.

In the example of FIG. 1, the coil base 112 holds the components 102-105 assembled on top of, but not necessarily directly over, the coil base 112 with sufficient offset to allow for the rotational motion of the latching block 108. The offset allows latching block 108 to move freely between blocking and non-blocking positions in order to change states based on the control signal. In addition, in this example the coil base 112 houses the coil 106 allowing the L-Bar 107 to pass through mechanically and freely rotate. The rotation magnet stop 111 further acts a magnetic spacer to keep the L-bar 107 from coming into direct contact with the rotation magnets 109. In another example of the LMP 100, the latching block 108 can be removed, and the coil base 112 flipped over (180 degrees) with the L-bar 107 located adjacent to the tactile pin 104. The L-bar 107 can be used as the latching mechanism to control blocking or non-blocking of the pin 104. In some implementations, the first arm (or arm one) 113 can be shaped (e.g., flattened or widened) to facilitate positioning under the end of the tactile pin 104. In another example, the magnetic spring 103 and ferrous plate 102 can be replaced with opposing magnets to form the magnetic spring and a capping material such as plastic can be used to close off the cavity 105. In another example, the magnetic spring 103 and ferrous plate 102 can be replaced with another spring mechanism such as, but not limited to, a mechanical spring and a capping material (e.g., plastic or other appropriate material) can be used to close off the cavity 105.

Figure 2:
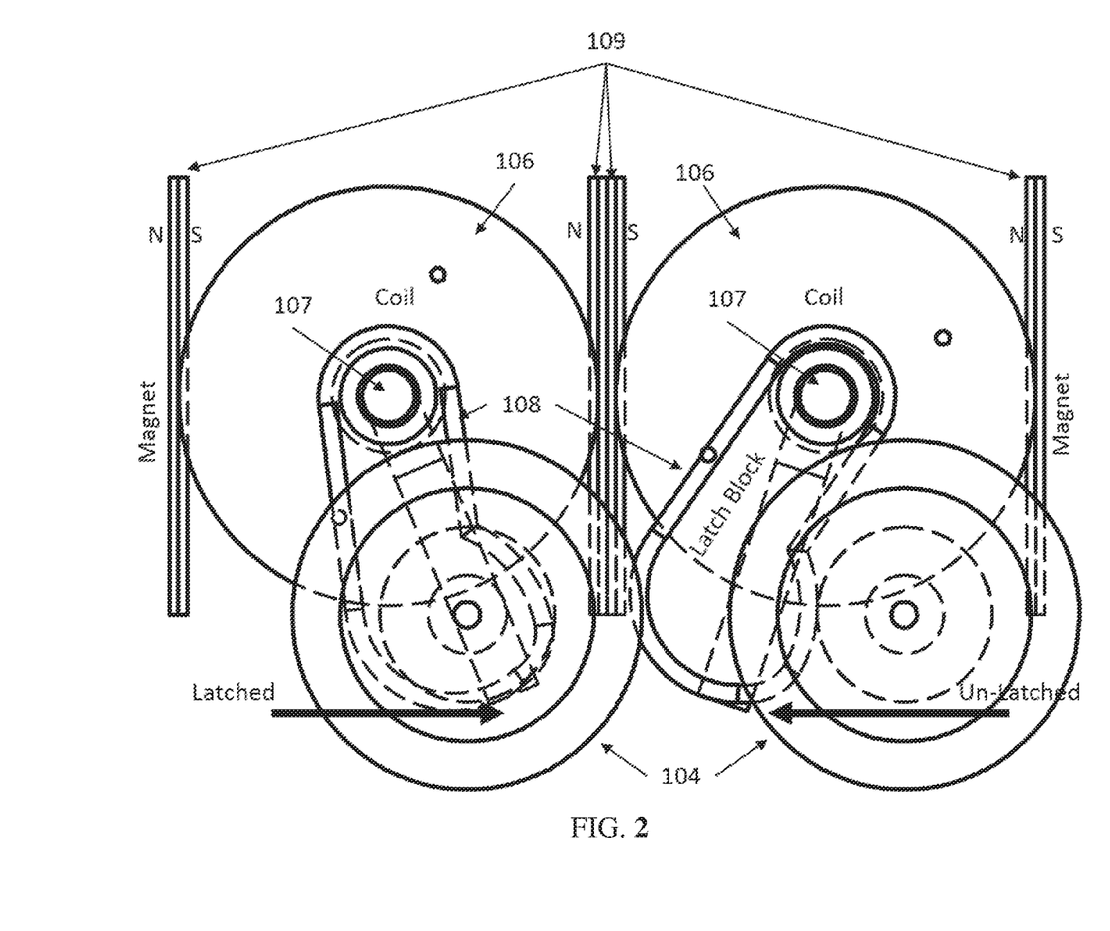
FIG. 2 is a top view illustrating an example of the rotation of the LMP latching mechanism of FIG. 1, in accordance with the various embodiments of the present disclosure.
Figure 3:
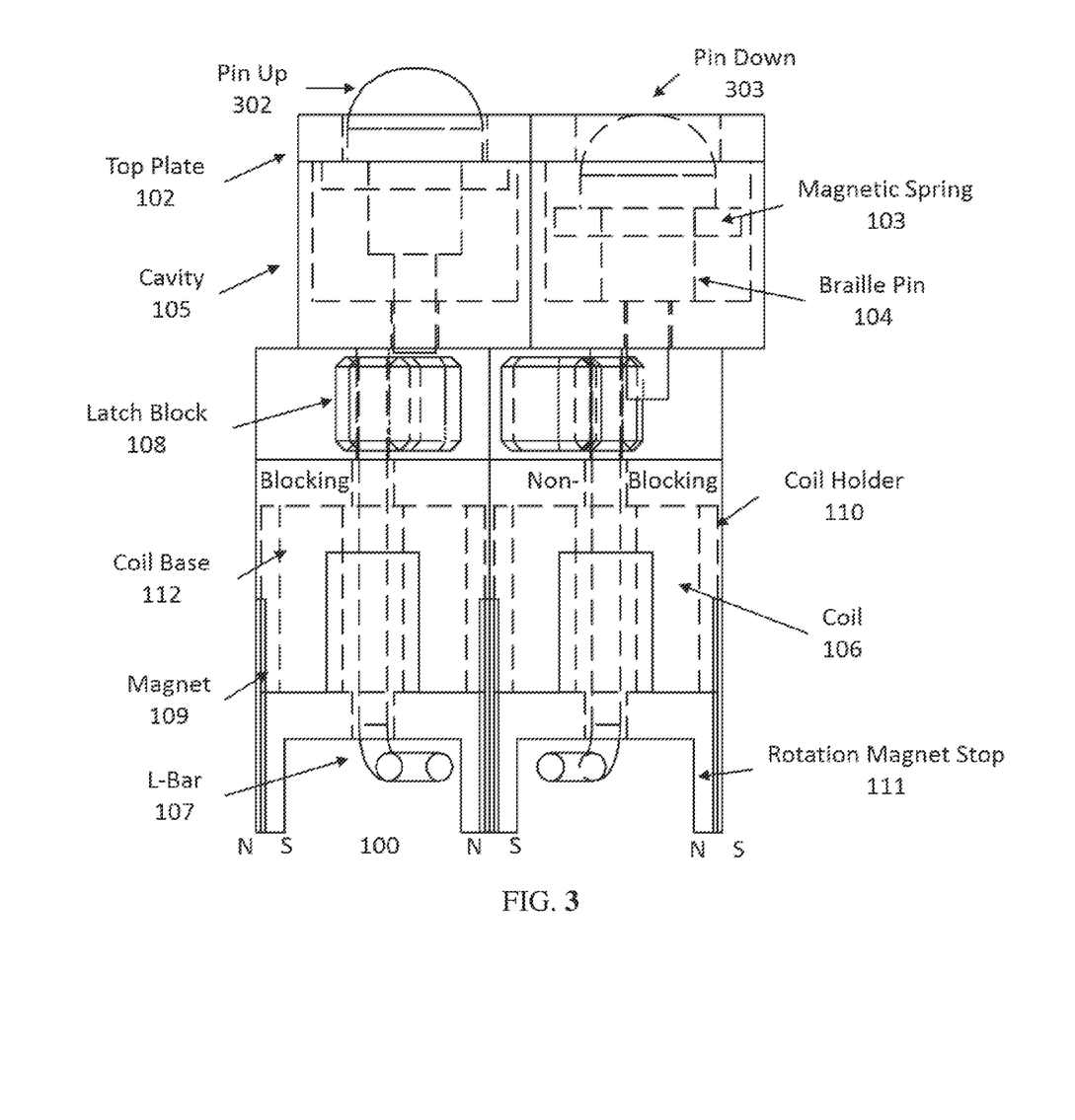
FIG. 3 is a side view illustrating an example of the rotation of the LMP latching mechanism of FIG. 1, in accordance with the various embodiments of the present disclosure.
Figure 4:
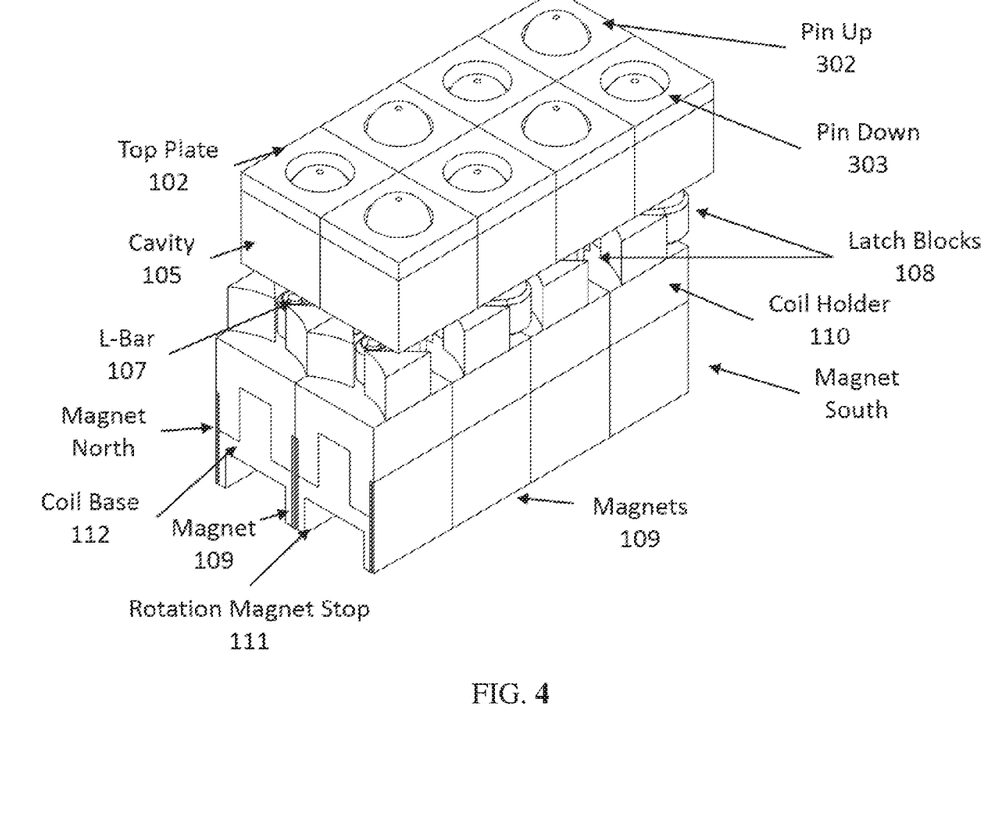
FIG. 4 is a perspective view illustrating example of an LMP array forming an 8 dot Braille cell, in accordance with the various embodiments of the present disclosure.

FIG. 2 and FIG. 3 illustrate the operation of the LMPs 100. The L-bar magnetic rotation system (LMP) 100 can rotate the latching block 108 in and out of position underneath the Braille pin 104, which is kept at reading position by the magnetic spring pre-load. In the illustrated example, a control signal has been applied to the coil 106 of the left LMP 100, causing the L-Bar 107 to be attracted to the North pole (N) of the rotation magnets 109, which rotates the latching block 108 under the bottom of the Braille pin 104, thereby blocking that pin to prevent it from being pressed down. In contrast, a control signal has been applied to the coil 106 of the right LMP 100, causing the L-Bar 107 to be attracted to the South pole (S) of the rotation magnets 109, which pivots the latching block 108 away from the Braille pin 104, thereby unblocking that pin and allowing it to be pressed downward. The LMPs 100 can be arranged to form an array of Braille dots such as, e.g., an arrayed 8 dot LMP Braille cell as shown in FIG. 4. Arrays can include any number of dots such as, e.g., 4, 6, 8, 10 or more dots.

At one moment, certain latching blocks 108 are rotated underneath tactile (or Braille) pins 104. Those Braille pins 104 which have latching blocks 108 underneath them become solid dots as distinguished by the readers finger as shown in the left LMP 100 of FIG. 3. At the same time, those Braille pins 104 which do not have latching blocks 108 underneath them can be pressed down and the finger tip can glide over without feeling them because the magnetic spring force is around 1 gram or less as shown in the right LMP 100 of FIG. 3. It should be noted, that other forces can be used. For example, one might use forces in a range from about 0.1 to about 1.5 g depending on the friction of the cavity 105, weight of the pins 104, etc. This force can be tuned or adjusted to give the desired (or best) performance and feel based on user feedback. Previous experiments have shown that when the supporting force on Braille pins 104 is less than 1 gram, the finger tip does not feel them. Therefore, a page of Braille characters can be formed and read by blind Braille readers.

When Braille characters are refreshed to new characters, certain latching blocks 108 are rotated into the latching (blocking) position underneath the Braille pins 104, and other latching blocks 108 are rotated out of the latching position to the non-blocking position. Blind Braille readers can read those pins 104 that are latched (or blocked) and glide over those pins that are unlatched (or non-blocked). In this way, Braille characters can be electrically refreshed. One of the advantages of this design is that it shifts the demand of forming raised hard Braille dots to simply moving a latching block 108 in and out of the latching position.

The mechanism of magnetic L-bar rotation latching: FIG. 2 and FIG. 3 illustrate the magnetic L-bar rotation latching system 100 in both the latched (blocked) and unlatched (non-blocked) states. In this example, rectangular rotation magnets 109 are placed in parallel (or substantially in parallel) to each other with the L-Bar 107 and coil 106 placed between the rotation magnets 109. A piece of iron can be bent into an L shape to create the L-Bar 107 where the first arm (or "arm one") 113 is not inserted into the coil 106. This arm 113 can be 1 to 2 mm long. The second arm (or "arm two") 114 is inserted into the coil 106 where it can be the length or height of the coil 106. "Arm one" 113 can be placed through the rotation magnet stop 111 between the two rotation magnets 109, and "arm two" 114 is inserted with the ability to rotate freely when a control signal is applied inside the coil 106.

Working mechanism of magnetic L-bar rotation latching: As shown in FIG. 2 and FIG. 3 "arm one" 113 of the L-bar is attracted to one of the rotation magnets 109 initially. For the convenience of discussion, assume the polarity of the rotation magnets 109 to be N-S-N-S from right to left. Initially, one arm of the L-bar 107 is attracted to the S pole of the rotation magnet 109 on the right. Then, a pulse current is applied to the coil 106 and the direction of the current is controlled to generate a magnetic field with S pole in the upward direction at the center of the coil 106. The direction of the magnetic flux will turn 90 degrees when coming out of the coil 106 and try to go back to the center of the coil 106 at the other end. The L-shaped soft iron bar is magnetized by the electro-magnetic field generated by the current. Specifically, the first arm 113 of the L-bar 107 that is attracted to the rotation magnet 109 will be magnetized with the polarity of S along the arm direction. When the electro-magnetic field generated inside the L-bar 107 is larger than the magnetic field strength on the surface of the permanent magnet, the first arm 113 of the L-bar 107 will be repelled by the rotation magnet 109 on the right side, and is simultaneously attracted to the rotation magnet 109 on the left side. The second arm 114 of the L-bar 107 serves as the shaft about which the rotation occurs. The L-bar 107 can be rotated back and forth between the two rotation magnets 109 by switching the current direction through the coil 106. The uniqueness and advantage of this arrangement of the magnets, coil, and soft iron L-bar is that it translates the electro-magnetic field generated by the vertical coil into horizontal rotation of a bar which serves as the latching block 108. This design enables the arrangement of multiple lines of Braille cells horizontally, with dot spacing matching the National Library Services for the Blind and Physically Handicapped (NLS) standard. FIG. 4 shows an example of an arrayed 8 dot LMP Braille cell. The standard spacing between center to center of two dots within one cell is 2.5 mm, but other spacing dimensions can be used.

Figure 5:
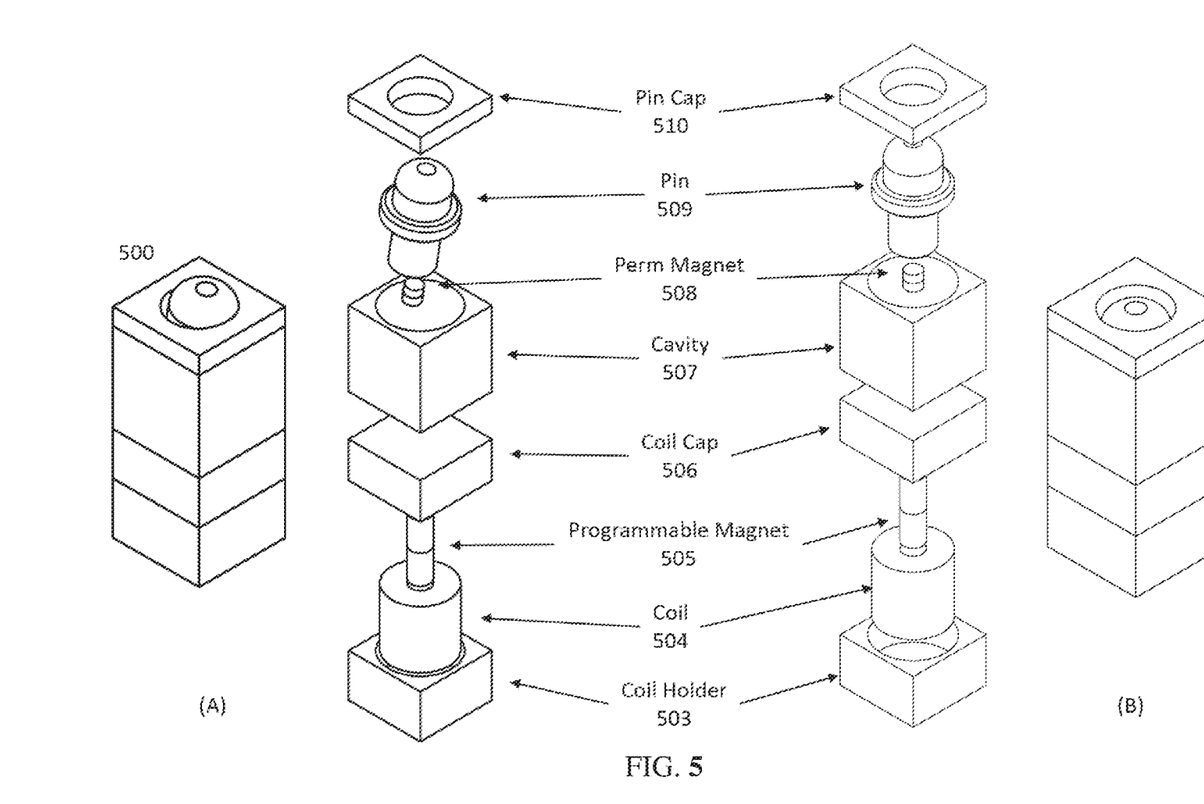
FIG. 5 illustrates an example of a magnetic pin tilt tactile actuator, Magnetic Pin Tilt (MPT), in accordance with the various embodiments of the present disclosure.

Magnetic Pin Tilt (MPT) Braille Actuators: Referring now to FIG. 5, shown is an example of a magnetic pin tilt tactile actuator Braille cell, MPT 500, in (A) the blocking or latched (up) position and (B) the non-blocking or unlatched (down) position. The MPT 500 includes a multitude of components as illustrated in FIG. 5. A coil holder 503 is used as a base to hold a programmable permanent magnet (PPM) assembly, which includes an electric coil 504 and a magnetically programmable material 505 that is formed and placed inside of the coil 504. The programmable magnet 505 can comprise a magnetic material that is able to change and hold a magnetic polarity when influenced by an opposite magnetic field such as one induced by an electric field in a coil or from a stronger magnet. The PPM assembly is placed inside of a coil cap 506 that provides physical isolation of the PPM assembly from the outside environment. For example, the coil cap 506 can provide protection from water (waterproof) or other environmental elements such as dust, dirt, etc.

A cavity 507 can be provided to help create a desired spacing for magnetic separation from the permanent magnet 508 for performance. The permanent magnet 508 is inserted into the Braille actuator pin 509. When the PPM's polarity is changed to one that repels the permanent magnet 508, the actuator pin 509 raises and tilts upon being vertically constrained by the pin cap 510. The tilting of the actuator pin 509 causes a mechanical interference within the cavity 507 resisting the pressure of outside stimuli such as a reader's finger. When the PPM's polarity is changed to one that attracts the permanent magnet 508, the actuator pin 509 centers itself and lowers upon being realigned with the PPM 505. Once in the down position 501, there is little to no tactile interference with the actuator pin 509 when the the pressure of outside stimuli such as a reader's finger is applied.

Figure 7A:
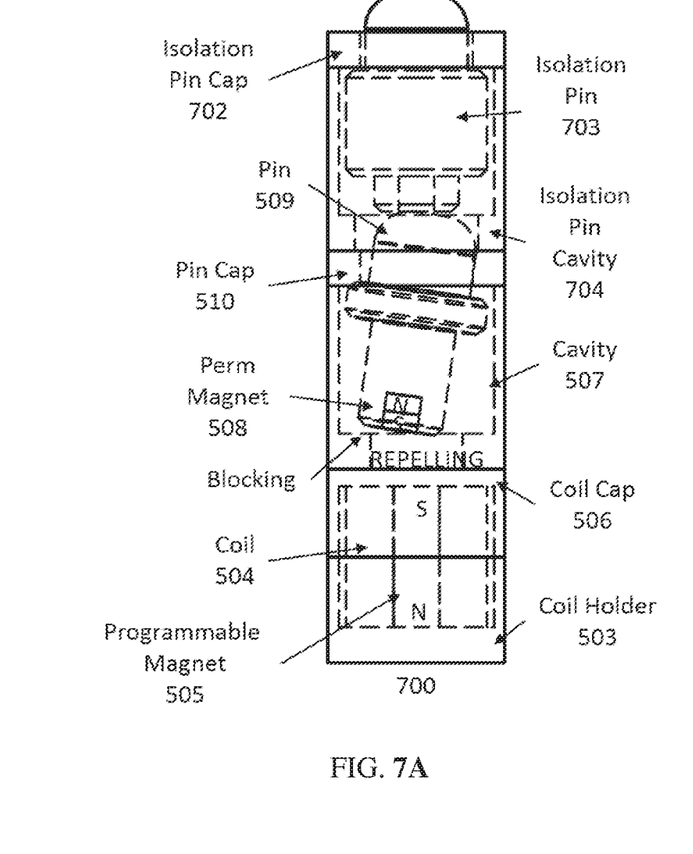
FIG. 7A and FIG. 7B are side views illustrating an example of the magnetic pin tilt tactile actuator MPT of FIG. 6A and FIG. 6B with pin isolation, in the up and down states respectively, in accordance with the various embodiments of the present disclosure.
Figure 7B:
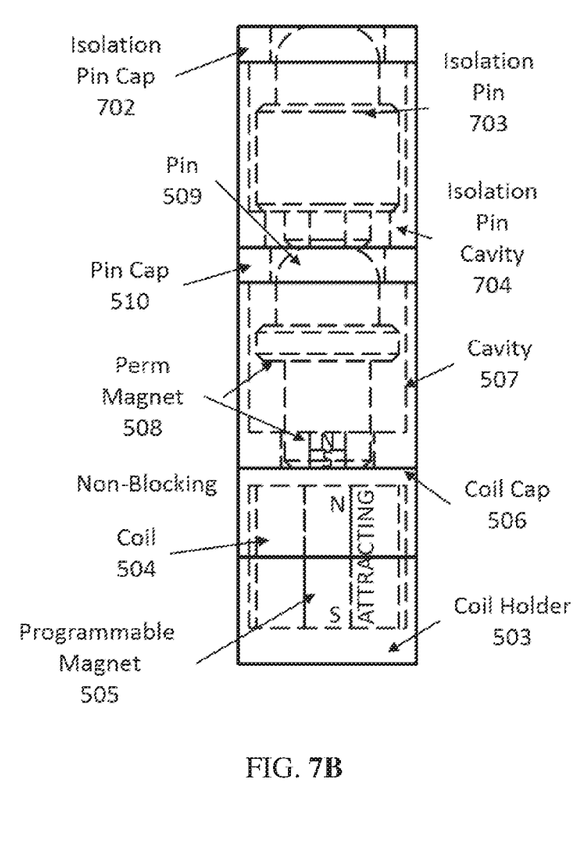

In another example, the actuator pin 509 can be isolated from one or more external forces. In the example shown in FIG. 7A and FIG. 7B, external forces such as, e.g., horizontal forces of outside stimuli such as the reader's finger can be isolated by an additional component that can be called a reader isolation pin 703. The reader isolation pin 703 can be horizontally constrained but not vertically constrained using a reader isolation pin cap 702 and isolation pin cavity 704 to guide the reader isolation pin 703. The actuator pin 509 is able to press against and raise the reader isolation pin while tilting underneath it. As the vertical force is the only force that can affect the actuator pin 509, this allows for a mechanical decoupling effect between the Braille dot touched by the user, the actuator portion of the MPT, and the outside stimuli.

In another example, the reader isolation pin 702 can be replaced with a component that allows a rolling action such as, but not limited to, a ball bearing. This can allow for additional mechanical decoupling. Another example, the aforementioned ball bearing can be included in the head of the actuator pin 509. In another example, the pin cap MO can be fabricated with one or more, e.g., indentations and/or one or more raised features that amplify the tilting of the actuator pin 509 when in the up or down positions. The electric coil 504 is connected to control circuitry that can change the direction of the magnetic field. In another example, the electric coil 106 is replaced with one or more electric wires that also induce a polarity changing magnetic field. In another example, the magnetic polarity of the PPM 505 is changed by a movable magnetic coil and/or permanent magnet and/or ferrous material to elicit the desired polarity change. In other implementations, the programmable magnet can be located in the actuator pin 509 and a permanent magnet can be fixed below the actuator pin 509 (e.g., in the recess of the cavity 507. Signals to the coil 504 can control the programmable magnet and thus actuator pin position.

Figure 6A:
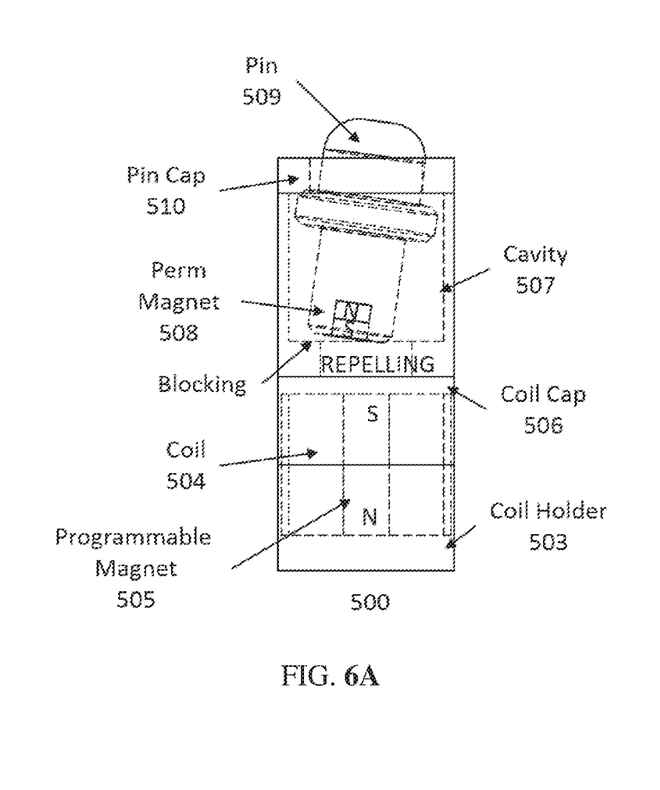
FIG. 6A and FIG. 6B are side views illustrating an example of the magnetic pin tilt tactile actuator, MPT of FIG. 5, in the up and down states respectively, in accordance with the various embodiments of the present disclosure.
Figure 6B:
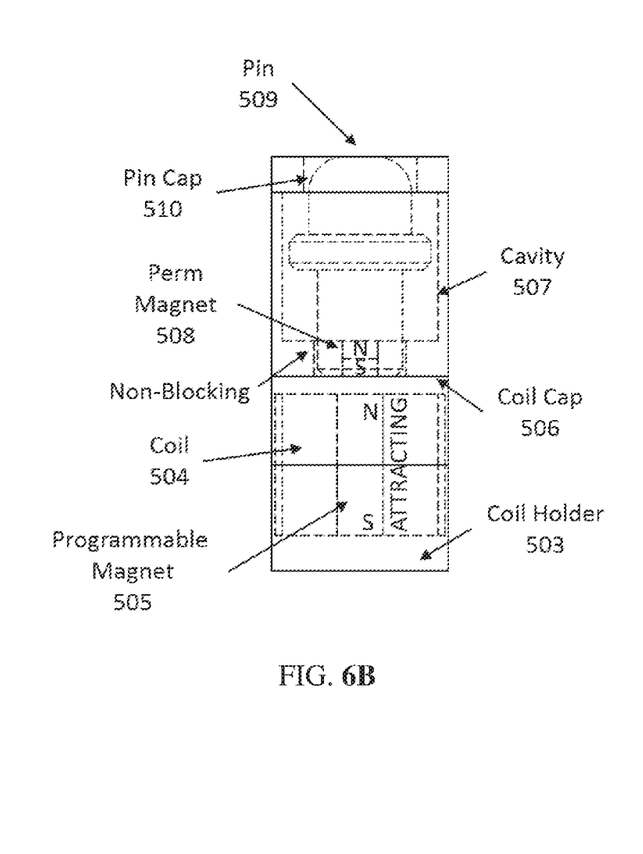

Actuation: In the example of FIG. 6A and FIG. 6B, the actuator pin 509 is in the North South axial orientation. The magnetically programmed material, e.g., a PPM 505, can switch between North South or South North, which is axially oriented. When the PPM 505 is switched to a South North orientation, the South South interaction of the permanent magnet 508 and the PPM oppose each other, raising the actuator pin 509 out of a recessed hole at the bottom of the cavity 507, as illustrated in FIG. 6A. Since the actuator pin 509 is out of the hole, and opposing magnetic fields are pushing against each other, the pin tilts or laterally moves slightly out of being axially aligned with the PPM 505. FIG. 6B shows when the PPM 505 is programmed to be North South. In that case, the actuator pins South is attracted to the North of the PPM 505 and aligns itself to fall into the recessed hole between the two magnets.

Figure 8:
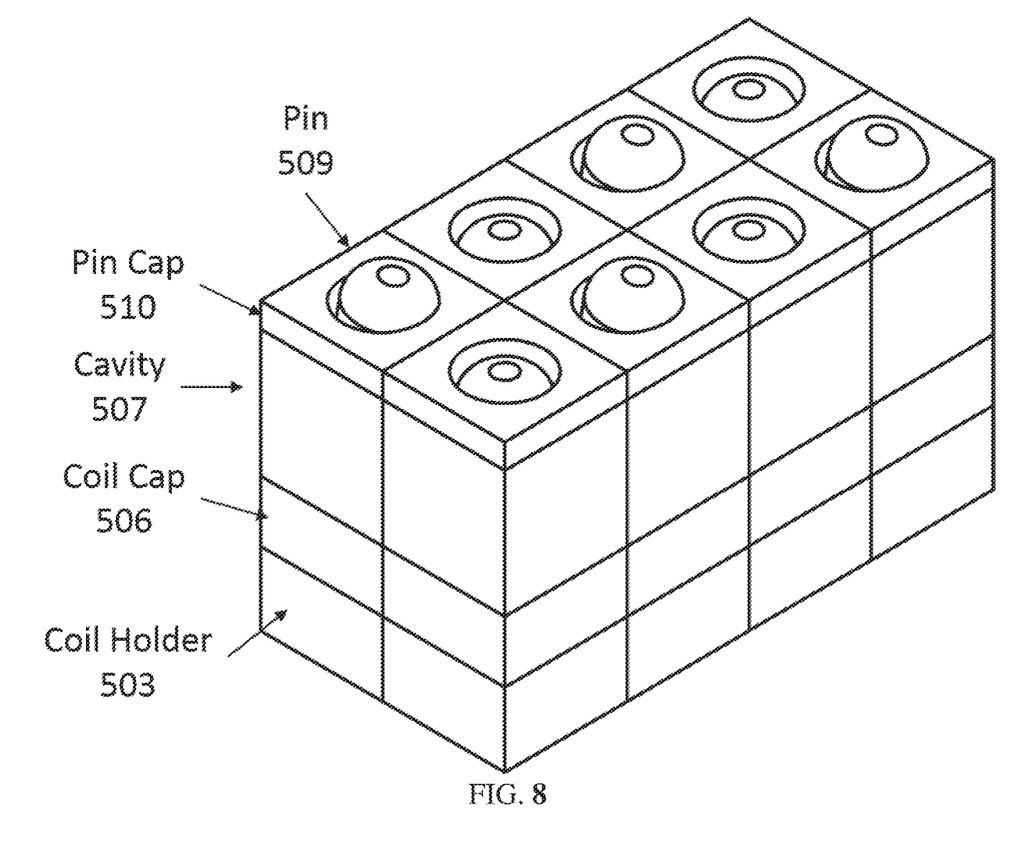
FIG. 8 illustrates an example of an MPT array forming an 8 dot Braille cell, in accordance with the various embodiments of the present disclosure.

This creates a mechanical interference with the exterior of the recessed hole as it resists falling back into the recessed hole between the pin and magnetically programmable material. When used as an electrically refreshable Braille dot, the dot moves in and out of the screen in the vertical orientation and is mechanically latched due to the tilting or lateral force effect of the opposing magnetic fields. This design enables the arrangement of multiple lines of Braille cells horizontally, with dot spacing matching the NLS standard. The MPT 500 can be arranged to form an array of Braille dots such as, e.g., an arrayed 8 dot MPT Braille cell as shown in FIG. 8. Arrays can include any number of dots such as, e.g., 4, 6, 8, 10 or more dots.

In fact, when the actuators are "ganged" into Braille cells and arrayed into the form factor of a display, the magnetic "interference" can actually be used to improve the tilting force of the actuator pin 509. This is because the neighboring actuators in close proximity actually attract or repel the neighboring pin 509 slightly further, reinforcing the latching mechanism. This is conversely true for most other proposed magnetically operated Braille actuators, where these forces are solely parasitic in nature and degrade performance. The standard spacing between center to center of two dots within one cell is 2.5 mm. It should be noted that the design is capable of working at other standard spacings as well as atypical spacings (smaller than 2.5 mm).

Figure 9A:
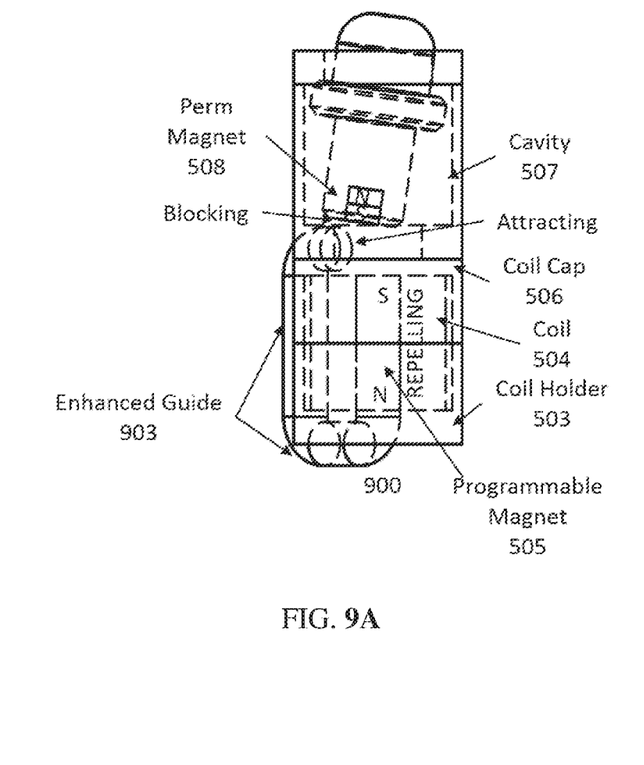
FIG. 9A and FIG. 9B are side views illustrating an example of the enhanced magnetic pin tilt tactile actuator, Enhanced Magnetic Pin Tilt (EMPT) based upon the MPT of FIG. 5, in the up and down states respectively, in accordance with the various embodiments of the present disclosure.
Figure 9B:
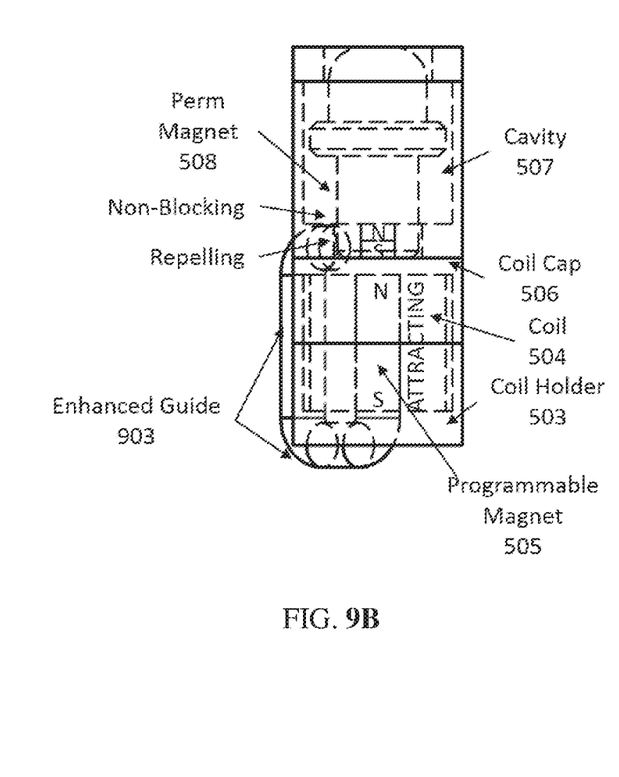

Enhanced Magnetic Pin Tilt (EMPT) Braille Actuators: Referring next to FIG. 9A and FIG. 9B, shown is an example of an enhanced magnetic pin tilt tactile actuator Braille cell, EMPT 900, in the blocking or latched (up) position and the non-blocking or unlatched (down) position respectively. The overall actuation and tilt mechanism stays the same as in the MPT 500 illustrated in FIG. 6A and FIG. 6B; however, as shown in FIG. 9A and FIG. 9B an additional magnetic pole (or enhanced magnetic flux guide) 903 is placed in close proximity to the actuator pin 509 and permanent magnet 508. The additional magnetic pole 903 guides the magnetic flux from the bottom of the PPM 505 and around the coil 504 to the actuator pin 509 and permanent magnet 508 to enhance the latching and de-latching performance by providing an attractive pole in the case of latching as shown in FIG. 9A and a repelling pole in the case of de-latching as shown in FIG. 9B.

Actuation: When the MPT actuator changes from the pin-down to the pin-up position, an enhanced latching mechanism—such as, e.g., an Iron (Fe) magnetic flux guide going from the PPM 500, transitioning around the outside of the coil 504, and terminating in close proximity of the actuator pin 509—will provide additional magnetic forces that would attract the pin 509. This flux guide 903, causes the bottom of the actuator pin 509 to be attracted to the exterior of the recessed hole on the side(s) of the flux guide 903, reinforcing the latch and thus enhancing the EMUP's latching performance. Upon cycling from the pin-up to the pin-down position, the magnetic flux travels in the opposite direction and repels the pin, pushing it back into alignment with the recessed hole. Thus, enhancing the EMPT's unlatching performance. The flux guide 903 can comprise other types of magnetically reversible material such as, but not limited to, Aluminium, Nickel and Cobalt (AlNiCo), Iron, Chrome, and Cobolt (FeCrCo), etc.

It should be noted, that the actuators described herein, could be further incorporated with sensors or become the sensors wherein tactile display become interactive; which can be used to operate and control electronic devices such as a Mobile phone, or other devices. This can be incorporated into, on and/or around the actuator through such electronic modalities as inductive, capacitive, resistive, optical, magnetic, etc. sensor technologies. The sensor can be realized through the magnet used in the tactile actuator and the electrical coil in the actuator.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a range of about 0.1 to about 5 should be interpreted to include not only the explicitly recited range of about 0.1 to about 5, but also include individual amounts (e.g., 1, 2, 3, and 4) and the sub-ranges (e.g., 0.5, 1.1, 2.2, 3.3, and 4.4) within the indicated range. The term about can include traditional rounding according to significant figures of numerical values. In addition, the phrase about x to y includes about x to about y.

At least the following is claimed:

1. A tactile actuator, comprising:
   a Braille pin comprising a first end extending through a tactile surface of the tactile actuator, the Braille pin supported by a magnetic spring; and
   a latching assembly comprising an L-bar including a first arm extending radially from a second arm that extends through an electrical coil, the latching assembly configured to block axial movement of the Braille pin by rotating the L-bar in response to a control signal provided to the electrical coil.

2. The tactile actuator of claim 1, wherein the latching assembly comprises a latching block attached to an end of the second arm opposite the first arm, wherein the latching block is rotated under a second end of the Braille pin by rotation of the L-bar to block the axial movement.

3. The tactile actuator of claim 1, wherein the first arm is rotated under a second end of the Braille pin by rotation of the L-bar to block the axial movement.

4. The tactile actuator of claim 1, wherein the magnetic spring comprises a magnet engaged with the Braille pin and a ferrous plate forming the tactile surface of the tactile actuator, where attraction of the magnet towards the ferrous plate provides a force supporting the Braille pin.

5. The tactile actuator of claim 4, wherein the magnet is a circular magnet surrounding a portion of the Braille pin and engaged with a shoulder of the Braille pin.

6. The tactile actuator of claim 1, wherein the Braille pin comprises a tactile surface at the first end.

7. The tactile actuator of claim 1, wherein the latching assembly comprises a coil base supporting the electrical coil and L-bar.

8. The tactile actuator of claim 7, wherein the latching assembly comprises first and second magnets of opposite polarities, the first and second magnets positioned on opposite sides of the coil base.

9. The tactile actuator of claim 1, wherein the L-bar is iron.

10. A tactile actuator, comprising:
    a Braille pin disposed in a cavity, the Braille pin comprising a first end configured to extend through a tactile surface of the tactile actuator, and a second end comprising a permanent magnet having a fixed polarity; and
    a latching assembly comprising a programmable magnet disposed in an electrical coil under the second end of the Braille pin, the latching assembly configured to adjust polarity of the programmable magnet in response to a control signal provided to the electrical coil, where a first polarity of the programmable magnet repels the fixed polarity of the permanent magnet thereby latching the Braille pin in a tilted position with the first end extending through the tactile surface, and a second polarity of the programmable magnet attracts the fixed polarity of the permanent magnet thereby retracing the Braille pin into the cavity.

11. The tactile actuator of claim 10, wherein the Braille pin is retracted into a recess in the cavity adjacent to the programmable magnet.

12. The tactile actuator of claim 10, wherein the tactile surface is provided by a pin cap disposed over the cavity of the tactile actuator.

13. The tactile actuator of claim 10, comprising an isolation pin assembly positioned on the tactile surface of the tactile actuator.

14. The tactile actuator of claim 13, wherein the isolation pin assembly comprises an isolation pin that is horizontally constrained and positioned on the first end of the Braille pin.

15. The tactile actuator of claim 10, wherein the latching assembly comprises a coil holder supporting the electrical coil and programmable magnet.

16. The tactile actuator of claim 14, comprising an enhanced magnetic flux guide extending along a side of the coil holder and across a length of the coil and programmable magnet.

17. A tactile display, comprising:
    an array of tactile actuators including a Braille pin and a latching assembly, wherein:
       the Braille pin comprises a first end extending through a tactile surface of the tactile actuator, the Braille pin supported by a magnetic spring; and
       the latching assembly comprises an L-bar including a first arm extending radially from a second arm that extends through an electrical coil, the latching assembly configured to block axial movement of the Braille pin by rotating the L-bar in response to a control signal provided to the electrical coil; or;
       the Braille pin is disposed in a cavity, the Braille pin comprising a first end configured to extend through a tactile surface of the tactile actuator, and a second end comprising a permanent magnet having a fixed polarity; and the latching assembly comprises a programmable magnet disposed in an electrical coil under the second end of the Braille pin, the latching assembly configured to adjust polarity of the programmable magnet in response to a control signal provided to the electrical coil, where a first polarity of the programmable magnet repels the fixed polarity of the permanent magnet thereby latching the Braille pin in a tilted position with the first end extending through the tactile surface, and a second polarity of the programmable magnet attracts the fixed polarity of the permanent magnet thereby retracing the Braille pin into the cavity.

18. The tactile display of claim 17, wherein the array of tactile actuators consists of a single line of tactile actuator.

19. The tactile display of claim 17, wherein the array of tactile actuators comprises multiple lines of tactile actuator.

20. The tactile display of claim 17, wherein the array of tactile actuators comprises 10 or more tactile actuators.

* * * * *